United States Patent
Lee (10) Patent No.: US 7,847,948 B2
(45) Date of Patent: Dec. 7, 2010

(54) TACTILE SENSOR BASED ON COUPLED SURFACE PLASMON RESONANCE

(75) Inventor: Kwangyeol Lee, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 333 days.

(21) Appl. No.: 12/202,142

(22) Filed: Aug. 29, 2008

(65) Prior Publication Data
US 2010/0053608 A1   Mar. 4, 2010

(51) Int. Cl.
   *G01N 21/55* (2006.01)
(52) U.S. Cl. .......................... 356/445; 356/326; 356/71
(58) Field of Classification Search ................. 356/326, 356/71, 445; 382/124; 385/12
   See application file for complete search history.

(56) References Cited

U.S. PATENT DOCUMENTS

| 2005/0265586 | A1* | 12/2005 | Rowe et al. | 382/124 |
| 2006/0017918 | A1* | 1/2006 | Cullum et al. | 356/301 |
| 2006/0034729 | A1* | 2/2006 | Poponin | 422/82.05 |
| 2006/0119837 | A1* | 6/2006 | Raguin et al. | 356/71 |
| 2006/0170918 | A1* | 8/2006 | Nishiuma | 356/318 |
| 2007/0030475 | A1* | 2/2007 | Rowe et al. | 356/71 |
| 2007/0252982 | A1* | 11/2007 | Wang et al. | 356/301 |
| 2008/0131939 | A1* | 6/2008 | Roper | 435/91.2 |

OTHER PUBLICATIONS

Ozcan, Meric, "High sensitivity displacement sensing with surface plasmon resonance", 2005, Proceedings of SPIE, vol. 5927, pp. 1-7.*
Wong et al., "Application of spectral surface plasmon resonance to gas pressure sensing", 2005, SPIE Optical Engineering, vol. 44(12), pp. 1-6.*

* cited by examiner

*Primary Examiner*—Kara E Geisel
(74) *Attorney, Agent, or Firm*—Edwards Angell Palmer & Dodge LLP; Kongsik Kim (57) ABSTRACT

Systems and methods for sensing an applied local tactile pressure are disclosed. The methods can include directing light onto a tactile sensing element that includes a metal nanoparticle layer. The methods can further include receiving at least a portion of the light scattered from the metal nanoparticle layer. The methods can further include determining a local pressure exerted on the tactile sensing element based at least in part on a change in a surface plasmon resonance (SPR) spectrum of the received portion of the scattered light.

28 Claims, 5 Drawing Sheets

TACTILE SENSOR BASED ON COUPLED SURFACE PLASMON RESONANCE

BACKGROUND

Description of the Related Technology

Tactile or touch sensors can be used in various applications including finger-print recognition for key-less door entries, touch-pads, touch-screens, object sensing in robotics, and the like.

Tactile sensors are typically based on a measurement of a change in capacitance or resistance caused by a touch, e.g., between a finger and a sensing element.

SUMMARY

In some aspects, there are devices that can include tactile sensing elements. The tactile sensing elements can include a nanoparticle layer that includes metal nanoparticles, and a metal film disposed relative to the nanoparticle layer. A change in a surface plasmon resonance (SPR) spectrum of light scattered from the nanoparticle layer can occur in response to a local pressure applied to the metal film. The devices can further include a spectrometer having an array of photodetectors configured to receive the light scattered from various portions of the nanoparticle layer.

In other aspects, there are tactile sensing elements that can include a metal film layer, an elastic layer formed over the metal film layer, and a nanoparticle layer formed over the elastic layer. The nanoparticle layer can include metal nanoparticles. A local pressure exerted on the metal film layer can change a surface plasmon resonance (SPR) spectrum of the light scattered from the nanoparticle layer.

In other aspects, there are methods of sensing a local tactile pressure. The methods can include directing light onto a tactile sensing element, wherein the tactile sensing element includes a metal nanoparticle layer. The methods can further include receiving at least a portion of the light scattered from the metal nanoparticle layer. The methods can further include determining a local pressure exerted on the tactile sensing element based at least in part on a change in a surface plasmon resonance (SPR) spectrum of the received portion of the scattered light.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and as illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to detecting or sensing tactile pressure.

Aspects of the present disclosure relate to methods of detecting tactile pressures. The methods can include directing light onto a tactile sensing element that includes a metal nanoparticle layer and determining a local pressure exerted on the tactile sensing element based at least in part on a change in a surface plasmon resonance (SPR) spectrum of light scattered from the metal nanoparticle layer.

Gold (Au) and Silver (Ag) nanoparticles with sub-wavelength size exhibit SPR scattering at visible wavelengths (400-700 nm). Coupling two or more of such nanoparticles shifts the SPR wavelengths. The resonance shift is sensitively dependent on the distance between the nanoparticles. Similarly, the coupling between a layer of nanoparticles and a layer of metal film show a distance-dependent resonance shift ($\Delta\lambda$=50-100 nm).

Figure 1:
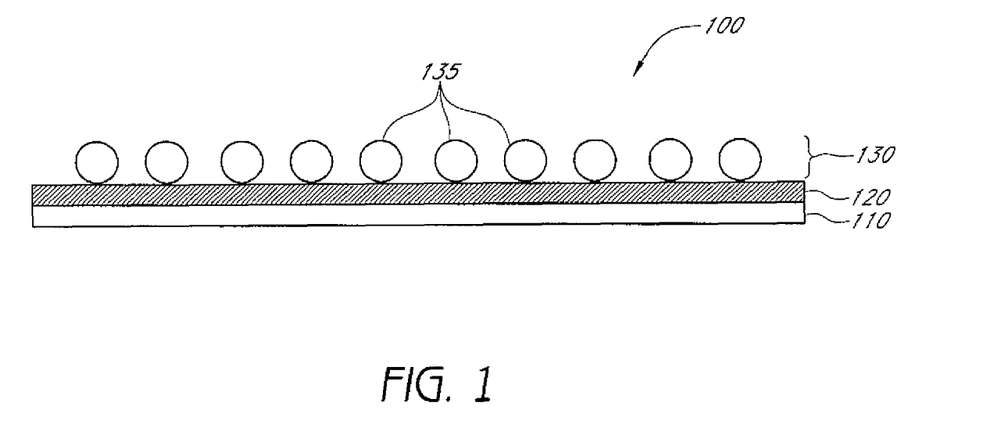
FIG. 1 is a schematic diagram of an example tactile sensing element.

FIG. 1 is a schematic diagram of an example tactile sensing element 100 for illustrating an example method of fabricating the same. First, a metal film layer 110 including a metal film (e.g., gold film of thickness of ~50 nm) is provided. Second a self-assembled monolayer (SAM) layer 120 is provided on top of the metal film layer 110. SAMs are crystalline chemisorbed organic single layers formed on a solid substrate by spontaneous organization of molecules. Thiol compounds and gold represent one of the well-established combinations for creating SAMs. In one embodiment, the SAM layer 120 can be formed by coating a surface of the metal film layer 110 with a thiol compound. The thiol compound can include, for example, alkanedithiol, aminoethane thiol (AET), aminoundecanethiol (AUT), and the like. For example, Journal of Physical Chemistry B 2006, 110, 17444-17451, incorporated herein by reference in its entirety, discloses fabricating SAMs by immersing gold or silver substrate in a 1.0 mM AET or AUT ethanol solution for 8-12 hours. In general, the SAM layer 120 is elastic. That is, the SAM layer generally returns to its original shape/dimension after a local pressure is removed. Due to the structural regularity of SAMS, the use of a SAM layer can produce a well-defined SPR spectrum.

A nanoparticle layer 130 is formed on top of the SAM layer 120. The nanoparticle layer 130 can include, for example, self-assembled metallic nanospheres 135. In certain embodiments, the metallic nanospheres 135 include gold nanospheres having diameters in the 10-50-nm range, for example. In other embodiments, the gold nanospheres have diameters in the 50-150 nm range. In some embodiments, there is a 10-50 nm spacing between the surfaces of the gold nanospheres. In other embodiment, the spacing can be in the 50-150 nm range. It shall be appreciated in light of the present disclosure, however, that other types of metallic nanospheres, including silver (Ag) nanospheres, can be used. It shall also be appreciated in view of the present disclosure that non-spherical nanoparticles as well as combinations of different metal nanospheres or nanoparticles can be used. Various methods of creating the self-assembly of metallic (e.g., Au) nanospheres are known in the art. For example, gold colloids with nominal diameters of various diameters in the nanometer ranges (e.g., 30-100 nm), which can be purchased from a nanomaterial supplier such as Ted Pella, Inc of Redding, Calif., are added to a borate buffer to create a solution in which the gold colloids are suspended in the solution. The combination of the metal film layer 110 and the SAM layer 120 (e.g., thiolate SAMs-Au film structure) is then immersed into the gold colloids-borate solution and allowed to fully react for 8-12 hours. The prepared substrate can then be rinsed with deionized water and dried with a stream of high-purity nitrogen.

The SAM layer 120 provides the tactile sensing element 100 a high sensitivity to touch. As used herein, a "tactile sensing element" refers to a sensing element where an output, e.g., scattered light, changes in response to a touch of or a contact with an object, e.g., a finger, a foot, a part of a robot, etc. For example, an alkanedithiol-based SAM layer undergoes a two-dimensional phase transition. For example, when the SAM layer is HS($CH_2$)$_n$SH, a local pressure can cause the $CH_2$ chains to move closer to the metal film layer 110 and cause a change in an effective dielectric constant "seen" by the electromagnetic wave traveling through the SAM layer. The change in the effective dielectric constant can contribute to a shift in the center wavelength of the SPR spectrum as will be described below. In addition, the applied local pressure can also cause a change in an interlayer distance between the SAM layer 120 and the nanoparticle layer 130. The change in the interlayer distance can also contribute to the shift in the center wavelength.

Figure 2:
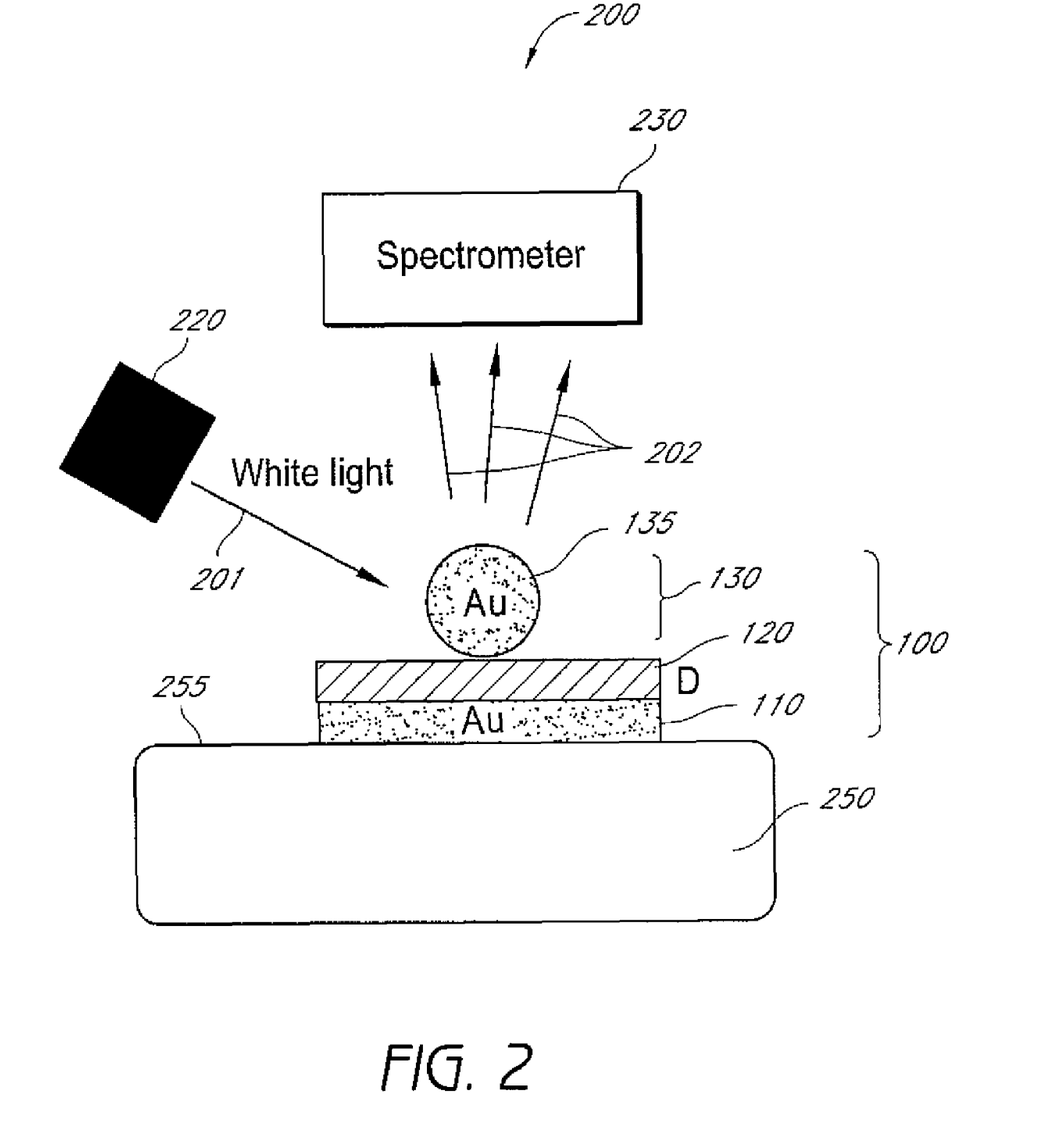
FIG. 2 is a diagram for illustrating an example tactile sensing system according to one embodiment.

FIG. 2 is a diagram illustrating an example tactile sensing system 200 according to one embodiment. The tactile sensing system 200 includes a tactile sensing element 100, a light source 220, and a spectrometer 230. The tactile sensing element 100 includes a metal (e.g., Au) film layer 110, a SAM layer 120, and a nanoparticle layer 130. The nanoparticle layer includes metal nanoparticles such as gold (Au) nanoparticles 135. In some embodiments, a variation (e.g., standard deviation) in the sizes (e.g. diameters) of the metal nanoparticles can be kept within 5% to effectively resolve a peak wavelength with a requisite resolution. In the example shown, an Au film is attached to a surface 255 of an object 250 that exerts a pressure on the tactile sensing element 100. The light source 220 can include, for example, a white light source such as a xenon (Xe) or tungsten (W) lamp or a laser that outputs light having a range of wavelengths, or any other suitable light source. The spectrometer 230 can include one or more photodetectors (not shown) that can receive light (photons) and output an electrical (e.g., voltage or current) signal that indicates the amount and/or phase of the received light (photons). Examples of such photodetectors include but are not limited to charge-coupled devices (CCD), photoresistors, photodiodes, and the like.

In operation, light 201 having a range of wavelengths generated by the light source 220 is incident on the nanoparticle layer 130 of the tactile sensing element 100, and the spectrum of the scattered radiation is collected by a spectrometer. In certain embodiments, the incident light is white light (such as Xe or W-lamp) having substantially all colors of visible light spectrum. In other embodiments, the incident light can be light having a certain range of wavelengths in the visible spectrum. In yet other embodiments, the incident light can be ultraviolet (UV) light.

Figure 3:
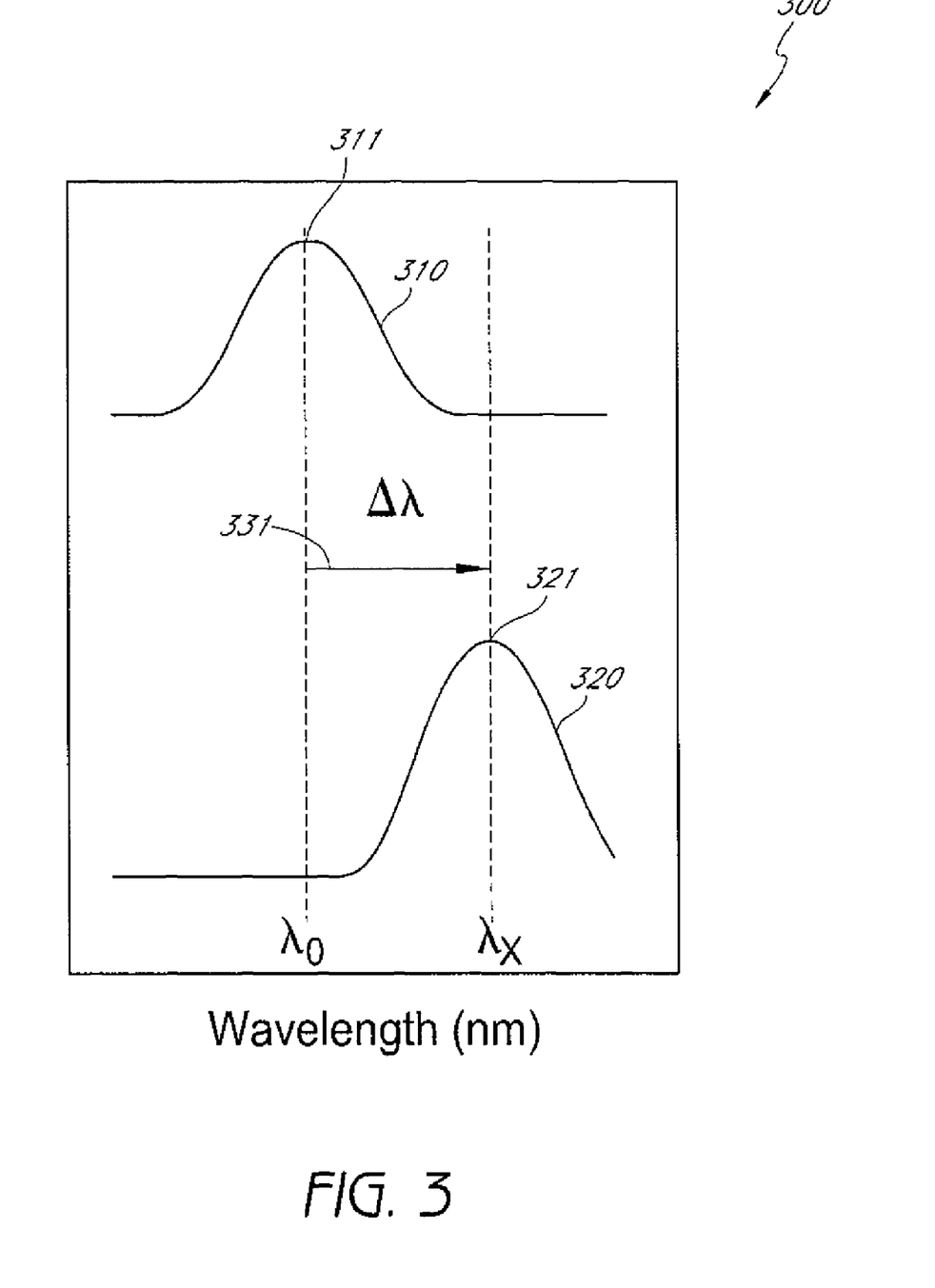
FIG. 3 shows two surface plasmon resonance (SPR) spectra of light scattered from a tactile sensing element; a reference SPR spectrum of the scattered light when there is no external pressure exerted on the tactile sensing element; and a measured SPR spectrum when there is a local pressure exerted on the tactile sensing element.

Part of the incident light 201 is scattered by the nanoparticles 135 in the nanoparticle layer 130. The spectrometer 230 receives the scattered light 202 and analyzes its wavelength spectrum. As discussed above, an alkanedithiol SAM layer undergoes a two-dimensional phase transition in response to a change in local pressure, which in turn, causes a change in the interlayer distance between the SAM layer 120 and the nanoparticle layer 130. The change in the interlayer distance can result in a shift in a center SPR wavelength as illustrated by FIG. 3 or in a change in the amplitude or phase of the scattered light in a certain wavelength or a range of wavelengths. In some embodiments, operating ranges of the tactile sensing element 100 can be altered by a structural change for the SAM layer, such as a change in the length of the aliphatic chains or an addition of side chains.

FIG. 3 shows two surface plasmon resonance (SPR) spectra of light scattered from a tactile sensing element (for example, the element 100 of FIG. 2), a reference SPR spectrum 310 of the scattered light when there is no external pressure exerted on the tactile sensing element; and a measured SPR spectrum 320 when there is a local pressure exerted on the tactile sensing element. An application of a local pressure causes a center SPR wavelength shift $\Delta\lambda$ 331 in the scattered radiation from $\lambda_0$ 311 to $\lambda_X$ 321. Accordingly, the center SPR wavelength shift $\Delta\lambda$ 331 of FIG. 3 is indicative of the local pressure exerted on the tactile sensing element, for example, element 100 of FIG. 2.

In certain embodiments, the tactile sensing system 200 can also include, for example, a processor (not shown), e.g., a microprocessor, a digital signal processor (DSP), a computer, a workstation, and the like. The tactile sensing system 200 can also include a nonvolatile memory (not shown), e.g., an EEPROM, flash memory, hard disk, and the like to store the reference SPR spectrum 310 and/or a value corresponding its center wavelength value $\lambda_0$ 311. The nonvolatile memory can also include a lookup table and/or an equation to correlate the center SPR wavelength shift $\Delta\lambda$ 331 to a local pressure ($P_X$). The processor can then receive and analyze the measured SPR spectrum 320 from the spectrometer 220 and determines its center wavelength $\lambda_X$ 321. The processor can then subtract $\lambda_X$ 321 from a stored value of $\lambda_0$ 311 to obtain $\Delta\lambda$ 331. The processor can then use a lookup table or an equation stored in the nonvolatile memory to determine the actual local pressure ($P_X$).

In certain embodiments, the tactile sensing system 200 may not output a calibrated local pressure. Instead, the system may indicate the presence of a "touch" on the surface. In such embodiments, the center SPR wavelength shift Δλ 331 may be compared to a threshold value and the output indicates whether the Δλ 331 exceeds the threshold value. In some embodiments, a change in the amplitude or phase of the scattered light in a certain wavelength or a range of wavelengths, in lieu of or in addition to the center SPR wavelength shift, can be used as a matrix to determine the local pressure.

Figure 4:
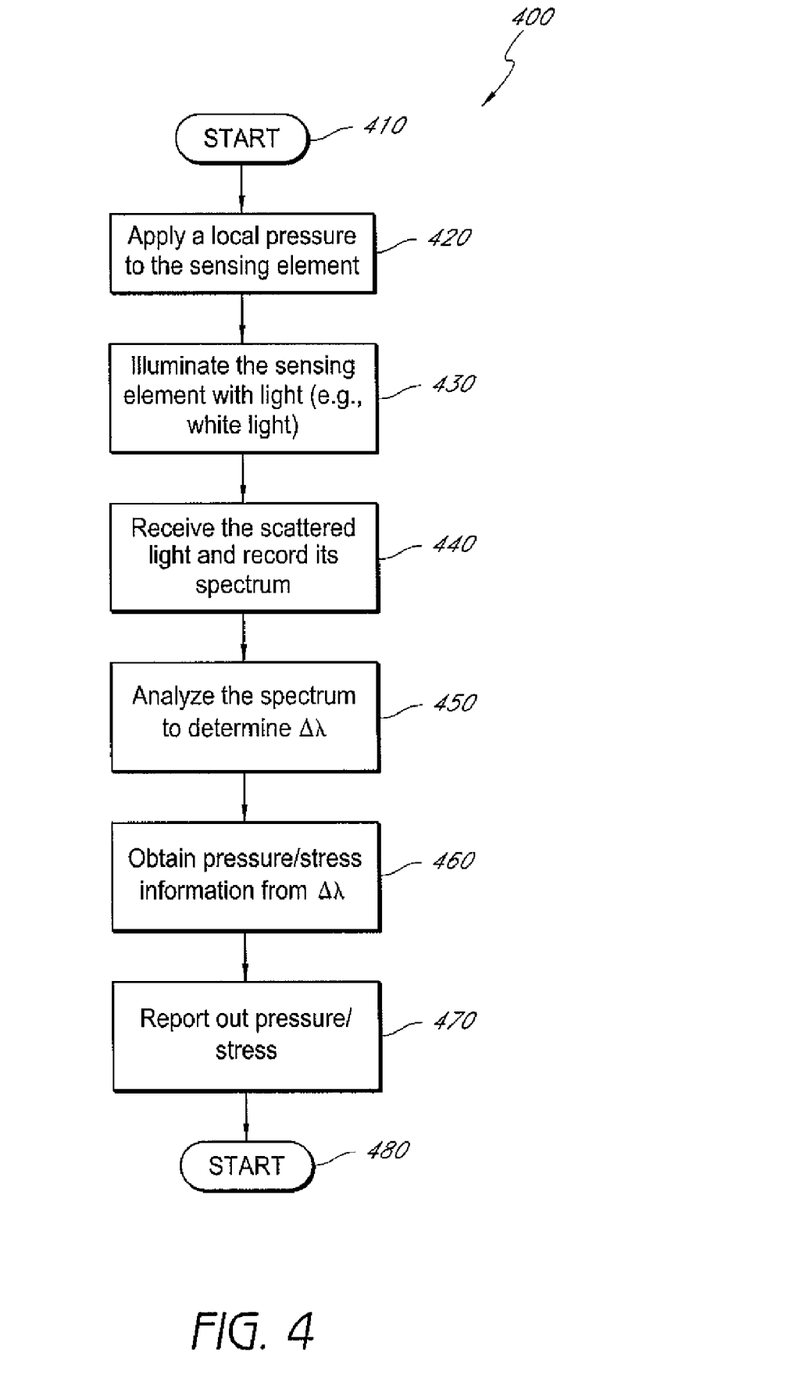
FIG. 4 is a flowchart illustrating an example process for sensing a local pressure via a tactile sensing system such as the one shown in FIG. 3 according to certain embodiments.

FIG. 4 is a flowchart for illustrating an example process 400 for sensing a local pressure via a tactile sensing system, such as the one shown in FIG. 3, according to certain embodiments. The process 400 begins at a start state 410 and proceeds to a state 420, where a local pressure (e.g., contact/touch/force) is applied to a tactile sensing element, for example, the element 100 shown in FIG. 2. The local pressure can come from a various sources such as from a finger touching a sensor pad for a keyless door or an automobile ignition system, or from a foot pressing on a floor equipped with an array of sensing elements to detect and track motions of a human in a home or professional security system. The process 400 proceeds to a state 430, where the sensing element is illuminated, for example, as described in connection with the FIG. 2. In this example a nanoparticle layer 130 of the tactile sensing element 100 is illuminated with an electromagnetic (EM) radiation from a light source. In some embodiments, the EM radiation can be white light from a xenon (Xe) or tungsten (W) lamp. In other embodiments, the EM radiation can be light of a limited range of wavelengths in the visible spectrum from a laser. In other embodiments, the EM radiation can be ultraviolet light.

The process 400 proceeds to a state 440, where a spectrometer receives light scattered from the nanoparticle layer 130 and records spectrum such as the SPR wavelength spectrum 320 shown in FIG. 3. The process 400 proceeds to a state 450, where the SPR wavelength spectrum is analyzed to determine a center SPR wavelength shift (e.g., Δλ 331 shown in FIG. 3), by subtracting a center wavelength 321 of the measure SPR wavelength spectrum from a stored center wavelength 311. The process 400 proceeds to a state 460, where the local pressure exerted on the tactile sensing element 100 is determined from the center SPR wavelength shift (Δλ) by the use of a lookup table or an equation that provides a relationship between Δλ and the local pressure. The process 400 proceeds to a state 470, where a value indicative of the local pressure (e.g., contact/touch/force) so determined is reported out by, for example, displaying the value on a display. In other embodiments, the value indicative of the local pressure may be used to cause another set of events. For example, the value may be logged by a data acquisition system for subsequent processing or used by an industrial control system in real time to control variable parameters such as temperature, pressure, and time, for example. The process 400 ends at state 480.

Figure 5:
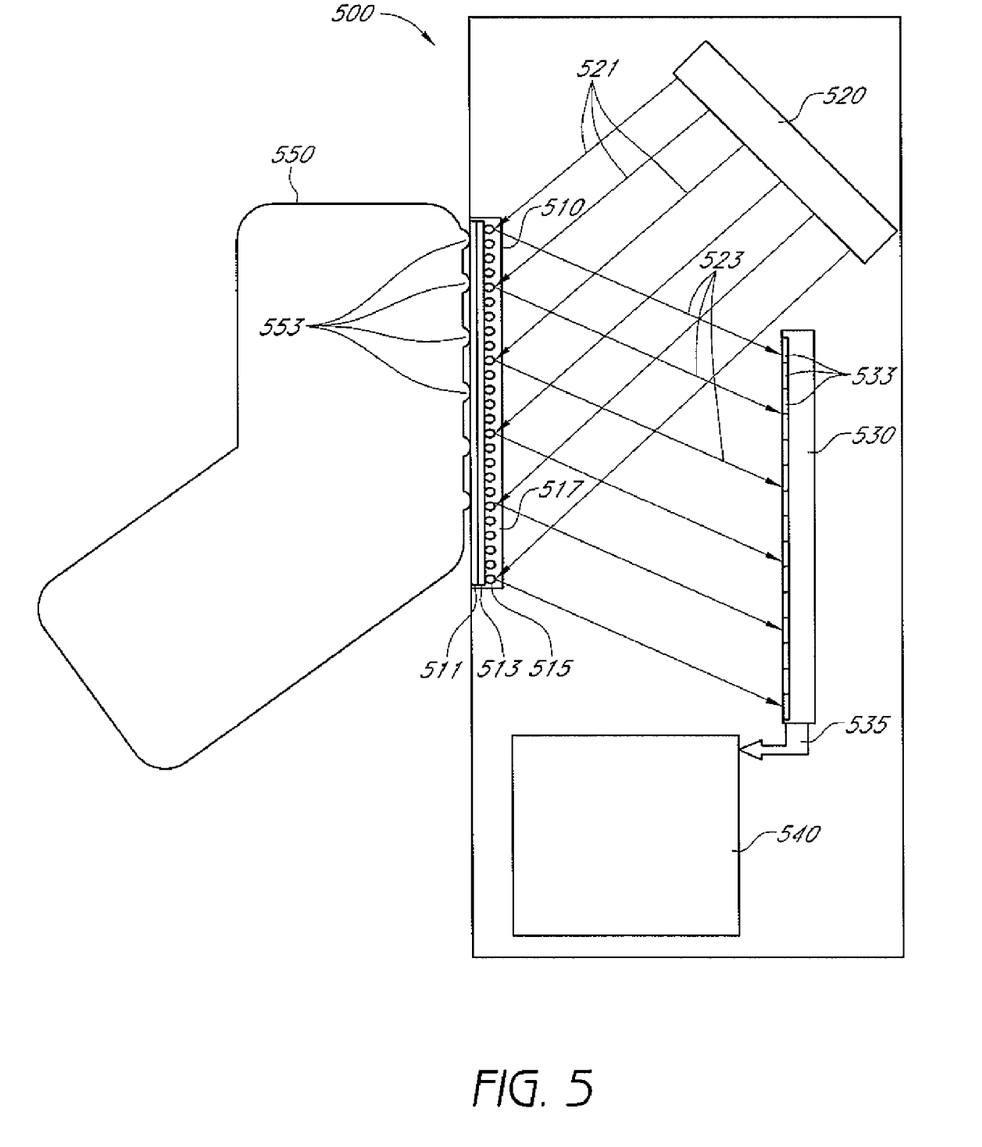
FIG. 5 is a diagram illustrating an example tactile sensing device that includes an array of photodetectors for resolving local pressure variations.

FIG. 5 shows an example tactile sensing device 500 that includes an array of photodetector elements for resolving local pressure variations. In this embodiment, the device 500 includes a tactile sensing element 510, a light source 520, a spectrometer module 530, and a processor 540. The tactile sensing element 510 includes a metallic layer 511, a SAM layer 513, a nanoparticle layer 515, and an enclosure 517. The spectrometer module 530 includes an array of photodetectors 533 which are responsive to light scattered from different areas of the nanoparticle layer 515. The photodetectors (not shown) can be any devices that can receive light (photons) and output an electrical (e.g., voltage or current) signal that indicates the amount and/or phase of the received light (photons). Examples of such devices include but are not limited to charge-coupled devices (CCD), photoresistors, photodiodes, and the like. While the photodetectors 533 are shown as arranged as a line of photodetectors in FIG. 5, the array can be a two-dimension array of photodetectors ranging from $Pd_{1,1}, \ldots Pd_{i,j}, \ldots Pd_{M,N}$, where $Pd_{i,j}$ corresponds to a photodetector located at (i, j) location of the two-dimensional array of photodetectors 533 that is configured to receive light scattered from a particular corresponding location of the nanoparticle layer 515 in the tactile sensing element 510.

The spectrometer module 530 and the processor 540 can be connected via a signal bus 535 having an array of wired or wireless connections that carry the outputs of the photodetectors to a signal processing circuitry and/or a processor. In one embodiment, the spectrometer module 530 or the processor 540 contains an array of analog-to-digital converters (ADCs) to convert electrical signals from the photodetectors into digital representations. In another embodiment, the spectrometer module 530 may include the processor 540 within itself.

In operation, an object 550, such as a human or robotic finger or a foot, exerts different pressures at different areas of the tactile sensing element 510. In certain embodiments, the device 500 may also include a protective membrane (e.g., a flexible polymer film) disposed on the metallic layer 511 to protect the metallic layer 511. The metallic layer may be a gold metal layer of a thickness of between about 10 nm to about 500 nm. For the purpose of the following description, assume that the device 500 is a fingerprint recognition system for a keyless door entry or automobile ignition and the object 500 that is exerting pressure on the tactile sensing element 510 is a human finger. The finger object 500 has peaks 551 and valley 553 corresponding to a fingerprint pattern. Local pressure would be greater in the areas of the tactile sensing element 510 underneath the peaks 551 than in the areas underneath the valleys. Therefore, the fingerprint pattern having peaks 551 and valleys 553 imparts two-dimensional pressure variations in the tactile sensing element 510.

The two-dimensional pressure variations imparted on the tactile sensing element 510 can be measured or sensed as follows. Light rays 520 from the light source 520 are incident on the tactile sensing element 510 and scattered by the nanoparticle layer 517 thereon as described with respect to FIG. 2 above. Light rays 523 corresponding to the scattered light are picked up by different photodetectors 533 of the spectrometer module 530. Digital representations (e.g., spectrometer data) of electrical signals from different photodetectors 533 are fed to the processor 540 via the signal bus 535.

The processor 540 analyzes the spectrometer data and determines or computes a SPR wavelength shift for the light rays received by each of the photodetectors 533. As discussed above, different areas of the tactile sensing element 510 experience different pressure variations thereon. Therefore, the light rays 523 scattered from different areas of the nanoparticle layer 517 would contain different SPR center wavelength shifts. A collection of the SPR center wavelength shifts provides a two dimensional map of pressure variations, which in turn, provides the fingerprint pattern. Alternatively, a filter of a known pass-band profile can be placed between the tactile sensing element 510 and the spectrometer module 530. The pass-band of the filter can be chosen such that the center (e.g., a point of highest transmission) of the pass-band coincides with the SPR center wavelength when there is no pressure applied to the tactile sensing element 510. The light rays 523 scattered from different areas of the nanoparticle layer 517 pass through the filter with different amounts of attenuation depending on the amount SPR center wavelength shifts caused by pressure variations at the tactile sensing element 510. The light rays passing through the filter are then detected by the photodetectors 533. The amplitudes of the detector outputs, which can indicate the amount of attenuation and, hence, SPR center wavelength shifts, can be used by the processor 540 to provide a dimensional map of pressure variation and a fingerprint pattern.

While the example tactile sensing device discussed with respect to FIG. 5 above was a fingerprint sensor for the keyless door entry and automotive ignition system, it shall be appreciated that different tactile sensing devices, such as touch pads or touch screens or footprint sensing systems for security application, can be also be implemented by the use of the illustrate principle.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device comprising:
    a tactile sensing element comprising:
        a nanoparticle layer comprising metal nanoparticles, and
        a metal film disposed relative to the nanoparticle layer, wherein a change in a surface plasmon resonance (SPR) spectrum of light scattered from the nanoparticle layer occurs in response to a local pressure applied to the metal film; and
    a spectrometer comprising an array of photodetectors configured to receive the light scattered from various portions of the nanoparticle layer.

2. The device of claim 1, further comprising a processor configured to analyze the SPR spectrum to determine a presence of the local pressure based at least in part on a shift in a center wavelength of the SPR spectrum.

3. The device of claim 1, further comprising a processor configured to analyze the SPR spectrum to determine a value indicative of the local pressure based at least in part on a shift in a center wavelength of the SPR spectrum.

4. The device of claim 1, wherein the metal nanoparticles are self-assembled metal nanoparticles.

5. The tactile sensing element of claim 1, wherein a standard deviation in the sizes of the metal nanoparticles is within 5%.

6. The device of claim 1, wherein the metal nanoparticles include gold (Au) nanoparticles.

7. The device of claim 1, wherein the metal film layer includes a gold (Au) metal film.

8. The device of claim 1, wherein the tactile sensing element further comprises a self-assembled monolayer (SAM).

9. The device of claim 8, wherein the SAM layer includes thiols.

10. The device of claim 9, wherein the thiols include alkanedithiols.

11. The device of claim 1, wherein the device includes a touch sensor that includes the tactile sensing element.

12. The device of claim 1, wherein the device includes a fingerprint recognition device that includes the tactile sensing element.

13. The device of claim 1, wherein the device includes a footprint recognition device.

14. The device of claim 1, wherein the array of photodetectors include a plurality of charge-coupled devices (CCDs).

15. A tactile sensing element comprising:
    a metal film layer;
    an elastic layer formed over the metal film layer; and
    a metal nanoparticle layer formed over the elastic layer, wherein the metal nanoparticle layer is configured to change a surface plasmon resonance (SPR) spectrum of the light that is reflected therefrom in response to an applied local pressure on the metal film layer.

16. The tactile sensing element of claim 15, wherein the metal film layer includes a gold (Au) metal film.

17. The tactile sensing element of claim 15, wherein the elastic layer includes a self-assembled monolayer (SAM) layer.

18. The tactile sensing element of claim 17, wherein the SAM layer includes thiols.

19. The tactile sensing element of claim 18, wherein the thiols include alkanedithiols.

20. The tactile sensing element of claim 15, wherein the metal nanoparticles include self-assembled metal nanoparticles.

21. The tactile sensing element of claim 15, wherein the metal nanoparticles include gold nanoparticles.

22. The tactile sensing element of claim 15, wherein a standard deviation in the sizes of the nanoparticles is within 5%.

23. The tactile sensing element of claim 15, wherein the size of the nanoparticles is in the range of 20 to 200 nm.

24. A method of sensing a local tactile pressure, the method comprising:
    directing light onto a tactile sensing element, wherein the tactile sensing element includes a metal nanoparticle layer;
    receiving at least a portion of the light scattered from the metal nanoparticle layer; and
    determining a local pressure exerted on the tactile sensing element based at least in part on a change in a surface plasmon resonance (SPR) spectrum of the received portion of the scattered light.

25. The method of claim 24, wherein the light directed onto the tactile sensing elements includes white light.

26. The method of claim 24, wherein the change in the SPR spectrum includes a shift in a center wavelength of the SPR spectrum.

27. The method of claim 26, wherein determining the local pressure includes comparing the center wavelength shift to a table relating center wavelength shifts to exerted local pressures.

28. The method of claim 26, wherein determining the local pressure includes solving an equation relating center wavelength shifts to exerted local pressures.

* * * * *